April 16, 1963  C. L. ZEISE, JR  3,085,921
RESINOUS TREATED FIBROUS SHEET MATERIAL
Filed March 10, 1960
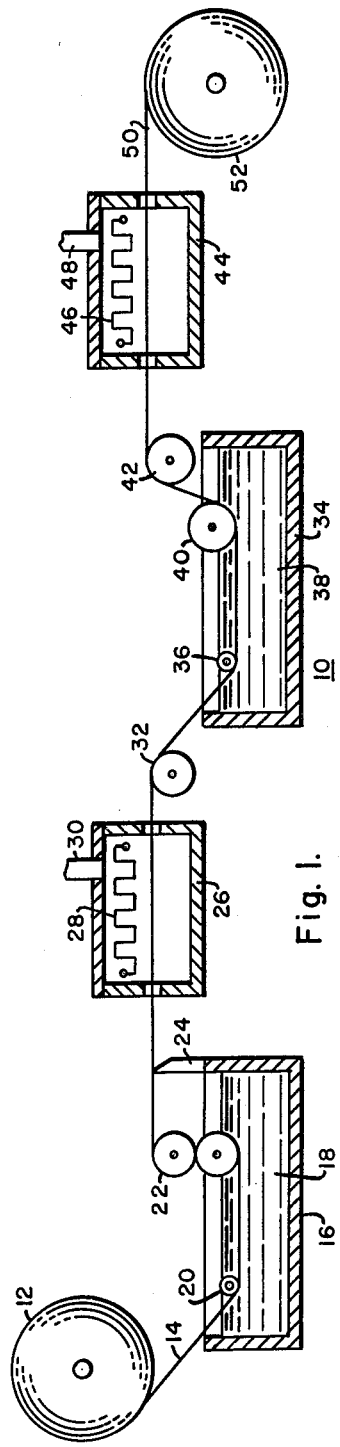
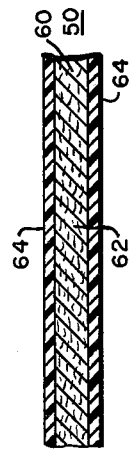
Fig. 2.
INVENTOR
Clarence L. Zeise Jr.
BY Charles T. Board
ATTORNEY United States Patent Office 3,085,921
Patented Apr. 16, 1963

3,085,921
RESINOUS TREATED FIBROUS SHEET MATERIAL
Clarence L. Zeise, Jr., Monroeville, Pa., assignor to Westinghouse Electric Corporation, East Pittsburgh, Pa., a corporation of Pennsylvania
Filed Mar. 10, 1960, Ser. No. 14,140
7 Claims. (Cl. 154—43)

This invention relates to resinous treated fibrous sheet material. More particularly, this invention relates to fibrous sheet material treated with a potentially thermosettable resinous composition and having applied to the surface thereof a relatively thin adherent coating of polyethylene.

Fibrous sheet material is often employed as a base material for the manufacture of resinous laminates, resinous tubular members and the like. The fibrous sheet is first treated with a potentially thermosettable resinous composition. The treated fibrous sheet material usually is not used immediately, but is stored for prolonged periods of time, usually in the form of rolls of the treated sheet material.

In order to prevent "blocking," which is defined as the undesired adhesion between the touching layers of the treated fibrous sheet material such as occurs under moderate pressure during storage, it has been customary to employ additional sheet material to serve as separators or inter-leaf materials between these layers. Separator materials that have been employed include silicone treated paper sheetings, sheets of glassine paper, sheets of polyethylene terephthalate and the like.

The use of these additional sheets of separator materials entails the removal and extra handling of the separator materials themselves with added inconvenience and expense to the user.

This invention is directed to fibrous sheet material that has been treated or impregnated with a potentially thermosettable resinous composition followed by the application of a relatively thin adherent coating of polyethylene to at least one side of the treated fibrous sheet material. The thin adherent coating of polyethylene prevents blocking during storage or handling of the treated fibrous sheet material. Further, it has been determined that the polyethylene coating need not be removed prior to the manufacture of laminates, tubular members and like members. The adherent coating of polyethylene has substantially no untoward effects on the subsequently prepared articles.

For a complete understanding of the nature of this invention, reference is made to the following detailed description and drawing, in which:

FIGURE 1 is a schematic view of apparatus for treating fibrous sheet materials in accordance with this invention; and, FIG. 2 is an enlarged fragmentary cross-section view of a sheet of fibrous material treated in accordance with this invention.

In accordance with this invention, fibrous sheet material is impregnated with a potentially thermosettable resin composition dissolved in a suitable volatile solvent. The resin impregnated or treated fibrous sheet material is passed through a drying oven to remove therefrom at least the volatile solvent. Often times, the applied resin is advanced in cure during this heat treatment to what is known in the art as the B-stage. The fibrous sheet material carrying the potentially thermosettable resin composition is treated then with polyethylene dissolved in a suitable solvent, and subsequently passed through a drying oven to evaporate therefrom the solvent. The thin layer of polyethylene is well bonded to the surface of the treated sheet material. There is thus provided a laminated member which comprises the treated fibrous sheet material and a relatively thin adherent coating of polyethylene on the surface thereof. The coating of polyethylene can be applied to one or both surfaces of the treated sheet material. It has been determined that it is more convenient to apply the coating of polyethylene to both surfaces of the treated sheet material.

The solution of polyethylene can be applied by well known methods as by brushing or spraying.

It is preferred to pass the treated sheet material through the polyethylene solution while contained in a suitable vessel therefor.

The treated fibrous sheet material of this invention can be rolled onto a mandrel for storage. During storage, there is substantially no possibility of the layers of the treated fibrous sheet material adhering to one another. The treated fibrous sheet material with applied polyethylene coating can be easily and readily unrolled prior to use. Furthermore, if desired, the treated fibrous sheet material of this invention can be cut into desired sizes and stacked, one sheet upon the other, without danger of blocking.

Fibrous sheet material commonly employed as base materials with resinous impregnating or treating materials are well known in the art and include cellulosic sheet materials such as kraft paper, alpha cellulose paper, cotton duck, purified cotton duck and the like. Sheet material prepared from inorganic fibers are also employed in the preparation of resin treated articles and include asbestos paper, glass mat, glass cloth and the like. Sheet material prepared from animal fibers, such as wool and silk, are also used as base materials. Other fibrous sheet materials that are employed for resin impregnation or treatment are fabrics prepared from synthetic resinous materials such as nylon cloth, fabrics prepared from polyethylene terephthalate, and the like. Fibrous sheet material comprising two or more fibrous materials, such for example as a cloth woven from a mixture of nylon and cotton fibers, can also be employed. The fibrous sheet material can be employed in non-woven or fabric (woven) form.

Potentially thermosettable resinous compositions employed for impregnating fibrous sheet material are well known in the art and include phenol-formaldehyde condensation products, epoxy resins, melamine-aldehyde resins, polyesters, urea-formaldehyde resins, and silicone resins. Solvents suitable for preparing impregnating varnish compositions of these resins are well known in the art.

The polyethylene employed as the coating material in carrying out this invention is one that has, preferably, a molecular weight of from about 1000 to 3000. Polyethylene resins of medium molecular weight, that is a molecular weight of about 20,000, can also be employed.

Satisfactory solution coatings can be prepared from polyethylene resins having a molecular weight as high as 20,000; however, it is usually necessary to maintain solutions of these high molecular weight polyethylenes at elevated temperatures in order to provide a usable solution thereof. For convenience in handling, therefore, it is preferred to use the lower molecular weight polyethylenes as above set forth.

While polyethylene resins are usually resistant to most chemicals and solvents at ambient temperatures, satisfactory solutions thereof can be produced by using certain solvents known in the art. Solvents for polyethylene resins include, certain chlorinated aromatic solvents, certain aromatic solvents, certain high boiling point aliphatic solvents, and mixtures of two or more. Examples of such solvents are carbon tetrachloride, trichlorethane, xylene, toluene, decane, undecane, and the like. Certain petroleum fractions that comprise about 90% by weight of the high boiling point aliphatic solvents can be employed satisfactorily. Usually, the boiling point range at which this petroleum fraction is removed from crude petroleum is from about 170° C. to 200° C.

Careful consideration must be given to the polyethylene solvent employed. It must have no adverse effects on the resin treated sheet material. Thus, for example, it must not dissolve the potentially thermoset resin that has been applied to the sheet material. It is recommended that only non-polar solvents be employed in preparing the polyethylene solution.

External heat is usually applied to the polyethylene solution to obtain and maintain a satisfactory solution. Temperatures of from about 60° C. to 90° C. have been found satisfactory for the lower molecular weight polyethylenes (molecular weights of from about 1000 to 3000). Higher temperatures can be employed if desired. The boiling point of the solvent employed will dictate the extreme temperatures that can be employed. Also, the temperature should not be so high that it converts the resin impregnant to a thermoset state.

Referring to FIG. 1 of the drawing, there is illustrated apparatus 10 for the continuous treatment of fibrous sheet material in accordance with this invention. A roll 12 of fibrous sheet material 14 is disposed at one end of the apparatus. The fibrous sheet material 14 can be any fibrous sheet material well known in the art for resin treatment. The fibrous sheet material 14 is withdrawn from the roll 12 and passes into a varnish dip pan 16 containing a resinous varnish composition 18 (a solution of a polyester resin, for example) beneath a roller 20, immersed in resin varnish 18 so that the fibrous sheet material 14 is soaked in the resin varnish 18. The fibrous sheet material is withdrawn from the resin varnish 18 and passes between a pair of squeeze rolls 22 where the amount of applied resin varnish composition is controlled by the setting of the rolls. The bottom side of the treated fibrous sheet material is drawn over a scraper 24 so as to remove any adhering superficial resin varnish compositions from that one side of the sheet. The scraping of the fibrous sheet material above described can be eliminated if desired.

The fibrous sheet material with the applied resinous varnish composition then passes into an oven 26 having electrical heating elements 28 or other suitable heating means where the solvent from the varnish is removed. The solvent vapors escape through the stack 30 of the oven. The heat treatment is carried out so as to remove at least the solvent from the treated sheet. Often times, for example when phenol-formaldehyde resins are applied, the heat treatment is carried out so as to advance the applied resin well into the B-stage.

B-stage is defined as an intermediate stage in the reaction of a thermosetting resin in which the material softens when heated and swells when in contact with certain liquids but does not entirely fuse or dissolve. The treated fibrous sheet material carrying resin in the B-stage is usually somewhat tacky, and upon the application of moderate pressure, the layers have a tendency to adhere to one another.

The treated fibrous sheet material as it emerges from oven 26 passes over roller 32 into the varnish dip pan 34 beneath the roller 36 emersed in a solution 38 comprising polyethylene dissolved in a suitable solvent so that there is provided on the surface of the previously treated fibrous sheet material a thin, adherent coating of polyethylene. The treated fibrous sheet material is then withdrawn from the solution 38 over rollers 40 and 42 and passes into an oven 44 provided with electrical heating means 46 where the solvent from the polyethylene solution is removed. Solvent vapors escape through stack 48. The product withdrawn from the oven 44 is a sheet 50 of fibrous sheet material impregnated with a potentially thermosettable resin composition and which carries on its surfaces a thin and adherent coating of polyethylene and is formed into a roll 52. The thickness of the applied coating will be as thin as possible, usually of the order of from about .2 mil to 1 mil.

Referring to FIG. 2 of the drawing there is shown treated fibrous sheet material 50 prepared in accordance with this invention. Fibrous sheet material 60 is impregnated with a potentially thermosettable resin 62 and is coated on either surface with thin coatings 64 of polyethylene. The roll of fibrous sheet material treated in accordance with this invetnion can be stored for prolonged periods of time without danger of blocking. Furthermore, instead of storing the fibrous sheet material in rolls, the sheets of treated fibrous sheet material can be cut and stacked for storage, without danger of blocking. It has been determined that blocking is particularly predominant in fibrous sheet material that has been treated or impregnated with polyester and epoxy resins.

Completely reactive polyester-type resin compositions that thermoset can comprise one or more compounds containing two or more unsaturated aliphatic groups. Examples of such compounds are diallyl phthalate and diallyl maleate. The liquid resinous compositions to be used may comprise two or more compounds having reactive unsaturated >C=C< groups capable of vinyl-type addition polymerization. Particularly good results are obtained by employing a solution comprising a liquid monomeric compound having the group $H_2C=C<$, in which is dissolved an unsaturated polyester having the group >C=C<. Particularly good results are secured by employing as the polyester resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydrides or mixtures thereof are reacted with a substantially molar equivalent of one or more polyhydric alcohols such as ethylene glycol, glycerol, propylene glycol, diethylene glycol, pentaerythritol, or mixtures thereof. Castor oil can be employed successfully in an esterification with maleic anhydride. The resultant ester, such as castor oil maleate ester, is admixed with a polymerizable unsaturated monomer, for example, monostyrene, in the proportions of from 10 to 85 parts by weight of the monostyrene and from 90 to 15 parts by weight of the ester.

The unsaturated alkyd esters are dissolved in a liquid unsaturated monomer having the group $H_2C=C<$. Suitable liquid unsaturated polymerizable monomers are: monostyrene, alphamethylstyrene, 2,4-dichlorostyrene, paramethylstyrene, vinyl acetate, methyl methacrylate, ethyl acrylate, diallyl phthalate, diallyl succinate, diallyl maleate, allyl alcohol, methyllyl alcohol, acrylonitrile, methyl vinyl ketone, diallyl ether, vinylidene chloride, butyl methacrylate, allyl acrylate, allyl crotonate, 1,3-chloroprene, and divinyl benzene, as well as mixtures of two or more of any of these monomers.

The unsaturated esters or alkyd resins are dissolved in a monomeric compound having the group $H_2C=C<$, such as monostyrene, or a simple substitution derivative of monostyrene, or a mixture of two or more monomers, as above described, to produce low viscosity, completely reactive solutions. Particularly good results are obtained by dissolving the unsaturated esters in monostyrene to produce solutions containing from about 20 to 70 parts by weight of monostyrene and the balance, 80 to 30 parts by weight, composed of the unsaturated esters.

The polymerizable compositions above described usually cannot be stored conveniently in mixed form since polymerization generally will take place even at room temperatures within a comparatively short period of time. To overcome or substantially minimize this difficulty it is preferred to incorporate a relatively small proportion of one or more polymerization inhibitors in the mixture of resinous polyesters and reactive unsaturated monomer. Polymerization inhibitors which are suitable for this purpose include substituted phenols and aromatic amines. More specific examples of polymerization inhibitors include hydroquinone, resorcinol, tannin, sym. alpha, beta naphthyl p-phenylene diamine, and the like. The inhibitor preferably is employed in relatively small proportions. Thus, amounts less than about 1.1% may be used, with amounts as small as about 0.01% to about 0.1% generally being sufficient.

The above solutions will polymerize when admixed with one or more vinyl-type polymerization catalysts. Therefore, they are usually admixed with a catalyst, such as benzoyl peroxide, lauroyl peroxide, methyl ethyl ketone peroxide, t-butyl hydroperoxide, ascaridole, tert-butyl perbenozate, di-t-butyl diperphthalate, ozonides, and similar catalysts, in an amount of from 0.5% to 5% and more, by weight based on the total weight of the composition. The proportion of the catalyst obviously may differ from these percentages.

The following example illustrates the preparation of a polyester resin that is potentially thermosettable.

*Example I*

A mixture of 1.05 mols of ethylene glycol and 1.0 mol of maleic anhydride are reacted while being sparged with carbon dioxide in a closed vessel at a temperature of 200° C. to form a polyester. Seventy parts of this polyester then are admixed thoroughly with 30 parts of monostyrene to form a resinous composition. To each 100 parts of the resulting resinous composition is added 2 parts of benzoyl peroxide.

Epoxy resins, also known as epoxide resins and glycidyl polyethers, are well known in the art and can be prepared by reacting predetermined amounts of at least one polyhydric phenol and at least one epihalohydrin in an alkaline medium. Suitable phenols include those that contain at least two phenolic hydroxy groups per molecule such, for example, as 4,4'-dihydroxy-diphenyl-dimethyl-methane and 4,4'-dihydroxy-diphenyl-methane. Epichlorohydrin is the preferred epihalohydrin; however, other epihalohydrins such as epibromohydrin and the like can be used. Epoxy resins can be liquid or solid at room temperatures.

The following are examples of commercially available epoxy resins.

*Example II*

An epoxy resin having a melting point of 97°–113° C., and an epoxide equivalency of 0.11 to 0.12 per 100 grams of resin, and a 40% solution in butyl carbitol has a viscosity of R–T on the Gardner-Holdt scale. This resin is available commercially as Epon 1004.

*Example III*

An epoxy resin having a melting point of 64°–67° C., an epoxide equivalency of from 0.19 to 0.20 per 100 grams of resin and a 40% solution in butyl carbitol has a viscosity of C–G on the Gardner-Holdt scale. This resin is available commercially as Epon 1001.

*Example IV*

Glass cloth of a thickness of about 10 mils is impregnated with the epoxy of Example I dissolved in butyl carbitol in the manner hereinbefore described with reference to the description of FIG. 1 of the drawing. The glass cloth is treated so as to have a resin content of 60% based on the untreated weight of the cloth. The impregnated glass cloth is then heated in an oven to remove the butyl carbitol solvent. To this treated glass cloth there is applied, in the manner hereinbefore described, a thin film of polyethylene having an average molecular weight of about 2000, the resulting polyethylene coating or film being adherent to the treated fabric and having a thickness of about 0.5 mil.

The glass cloth tretaed as in Example IV is rolled into rolls for storage. The roll can be stored for prolonged periods of time without any danger of blocking.

Some of the treated cloth is cut into four inch squares. Twelve of these squares are superimposed upon one another and consolidated in a press by the application of heat and pressure. The applied heat and pressure will first fuse the applied resin and then harden it into a final insoluble and infusible C-stage resin uniting the individual laminations of fibrous glass cloth into a high density, laminated structure.

It is to be noted that the applied film of polyethylene which serves as an anti-blocking agent during storage of the treated fibrous glass cloth is not removed prior to bonding, and it has been determined that its removal is not necessary. There are no untoward effects on the physical and electrical properties of laminates and other molded articles prepared therefrom.

This invention has been described with particular reference to polyethylene as the applied coating and anti-blocking material. It is to be understood that other polyolefins such as polyisobutylene, polypropylene and mixtures of polyethylene and other polyolefins can be employed as surface coatings for resin treated fibrous sheet material to prevent undesired blocking during storage and handling.

It is to be understood that the above description and drawing are illustrative of the invention and not in limitation thereof.

I claim as my invention:

1. A unitary member suitable for use in electrical grade laminates comprising fibrous sheet material impregnated with a potentially thermosettable resinous composition and a coating of polyethylene about 0.2 to 1 mil thick on at least one surface of the impregnated sheet material, said coating of polyethylene preventing blocking of the material during storage.

2. A unitary member suitable for use in electrical grade laminates comprising fibrous sheet material impregnated with a potentially thermosettable resinous composition and a relatively thin coating of polyethylene on at least one surface of the impregnated sheet material, said coating of polyethylene preventing blocking of the material during storage.

3. A unitary member suitable for use in electrical grade laminates comprising fibrous sheet material impregnated with a potentially thermosettable resinous composition selected from the group consisting of phenol-formaldehyde resins, melamine aldehyde resins, ureaformaldehyde resins, silicone resins, polyester resins, and epoxy resins, and a coating on at least one surface of said impregnated sheet material of from about 0.2 to 1 mil in thickness of polyethylene having an average molecular weight of from about 1000 to 3000, said coating of polyethylene preventing blocking of the material during storage.

4. A laminated unitary member characterized by electrical properties comprising a plurality of fibrous sheets having been impregnated with a thermoset resinous composition and having applied thereto a relatively thin coating of polyethylene on at least one surface of each of said impregnated sheets, the sheets having been thereafter bonded together by said thermoset resinous composition.

5. In the method of treating fibrous sheet material suitable for use in electrical grade laminates the steps comprising impregnating the fibrous sheet material with a solvent solution of a potentially thermosettable resinous composition, removing the solvent therefrom, applying to at least one surface of the impregnated sheet material a solution comprising polyethylene and a solvent, and thereafter removing the solvent therefrom whereby there is provided a unitary member that can be rolled into a roll for storage without danger of blocking.

6. In the method of treating fibrous sheet material suitable for use in electrical grade laminates the steps comprising impregnating the fibrous sheet material with a solvent solution of a potentially thermosettable resinous compositions selected from the group consisting of phenol-formaldehyde resins, melamine-aldehyde resins, urea-formaldehyde resins, silicone resins, polyester resins, and epoxy resins, removing the solvent therefrom, applying to at least one surface of the impregnated sheet material a solution comprising polyethylene having an average molecular weight of from about 1000 to 3000 dissolved in an organic solvent, and thereafter removing the organic solvent to provide a unitary member comprising resin impregnated fibrous sheet material having on at least one surface thereof a thin coating of polyethylene, whereby the unitary member can be rolled into a roll and stored for prolonged periods of time without danger of blocking.

7. In the method of treating fibrous sheet material suitable for use in electrical grade laminates, the steps comprising impregnating the fibrous sheet material with a solvent solution of potentially thermosettable resinous composition, removing the solvent therefrom, applying to at least one surface of the impregnated sheet material a solution comprising polyethylene and a high boiling aliphatic petroleum fraction, and thereafter removing the solvent therefrom whereby there is provided a unitary member which can be rolled into a roll for storage without danger of blocking.

References Cited in the file of this patent
UNITED STATES PATENTS

| | | |
|---|---|---|
| 2,482,499 | Nagel | Sept. 20, 1949 |
| 2,550,465 | Gorski | Apr. 24, 1951 |
| 2,683,105 | Forbes | July 6, 1954 |
| 2,770,608 | Barker et al. | Nov. 13, 1956 |
| 2,784,763 | Short | Mar. 12, 1957 |